United States Patent [19]

Moser

[11] Patent Number: 5,315,872
[45] Date of Patent: May 31, 1994

[54] LIQUID LEVEL SENSOR FOR ELECTRICALLY CONDUCTIVE LIQUID

[75] Inventor: Daniel J. Moser, Magna, Utah

[73] Assignee: Edo Corporation, Fiber Science Division, Salt Lake City, Utah

[21] Appl. No.: 62,909

[22] Filed: May 11, 1993

[51] Int. Cl.$^5$ ............................................. G01F 23/22
[52] U.S. Cl. .................... 73/304 C; 73/149; 361/284
[58] Field of Search .............. 73/304 C, 149; 361/284; 340/620

[56] References Cited

U.S. PATENT DOCUMENTS

| | | | |
|---|---|---|---|
| 2,700,901 | 2/1955 | Rickner | 361/284 X |
| 3,025,201 | 3/1962 | Ponemon | 73/304 C |
| 3,135,916 | 6/1964 | Tannenbaum et al. | 324/678 |
| 3,180,146 | 4/1965 | Hossack | 73/304 C |
| 3,285,068 | 11/1966 | Morris | 73/304 C |
| 4,099,167 | 7/1978 | Pomerantz . | |
| 4,952,914 | 8/1990 | Mueller | 361/284 X |
| 4,987,776 | 1/1991 | Koon . | |
| 5,017,909 | 5/1991 | Goekler . | |
| 5,049,826 | 9/1991 | Sasao . | |
| 5,052,223 | 10/1991 | Regnault . | |
| 5,144,835 | 9/1992 | McDonald . | |

Primary Examiner—Daniel M. Yasich
Attorney, Agent, or Firm—Thorpe North & Western

[57] ABSTRACT

Apparatus for measuring the volume of an electrically conductive liquid held in a confined area includes a tank constructed of electrically conductive, fiber-reinforced composite material having an inside surface and an outside surface. An electrically insulative liner is disposed in the tank against the inside surface thereof to receive and hold the liquid. A voltage source supplies an electrical charge to the tank walls, with ground potential being supplied to the liquid, to thereby develop a capacitance between the tank walls and the liquid. The capacitance varies with variation in the volume of liquid and thus by measuring the capacitance, a measure can be made of the volume of liquid in the tank.

14 Claims, 1 Drawing Sheet

LIQUID LEVEL SENSOR FOR ELECTRICALLY CONDUCTIVE LIQUID

BACKGROUND OF THE INVENTION

This invention relates to a liquid level sensor for measuring the level of an electrically conductive liquid in an electrically conductive, fiber-reinforced composite receptacle in which the receptacle construction itself comprises a component of the measuring apparatus.

In the past, a variety of methods have been employed for measuring the level or volume of liquid in a tank, including both mechanical and electrical methods. The mechanical methods have typically utilized some type of float which, because it stayed afloat on the surface of the liquid, could provide an indication by mechanical linkages of its position and thus of the level of the liquid.

Electrical methods of measuring liquid levels in tanks have included both (1) positioning electrical components within the tank, such as a column of switches which close when submerged in the liquid or underwater acoustic devices which determine the liquid level by reflected sonar signals, and (2) positioning some electrical components externally, such as capacitor plates to measure capacitance (where the level of liquid in the tank would affect the magnitude of the capacitance). In the latter arrangement, metal foil or wire screens have been placed on the exterior of the tanks to provide the capacitive sensing but this, of course, adds weight and additional components to the tank construction.

Various liquid level sensors are disclosed in U.S. Pat. Nos. 4,099,167, 5,017,909, 5,144,835, 5,049,826, 5,052,223, and 4,987,776.

SUMMARY OF THE INVENTION

It is an object of the invention to provide a lightweight fiber-reinforced composite vessel which includes in its construction, principal components for measuring the level of an electrically conductive liquid held in the vessel.

It is also an object of the invention to provide a liquid level sensor for measuring the volume of an electrically conductive liquid in a tank, in which major components of the sensor constitute part of the tank construction.

It is a further object of the invention to provide such a sensor which requires few components other than the tank structure itself.

It is a additional object of the invention to provide such a sensor and tank which is easy to fabricate, sturdy and lightweight.

The above and other objects of the invention are realized in a specific illustrative embodiment of a liquid level sensor for determining the level of an electrically conductive liquid in a receptacle which includes electrically conductive, fiber-reinforced composite walls defining the receptacle and including an outer surface and an inner surface, a non-conductive liner disposed in the receptacle against the inner surface thereof to define a volume for receiving the electrically conductive liquid, apparatus for developing an electrical capacitance between the receptacle walls and the liquid contained in the receptacle where the capacitance varies with variation in the level of the liquid, and apparatus for measuring the capacitance to thereby provide a measure of the level of the liquid.

In accordance with one aspect of the invention, the capacitance developing apparatus includes an electrode bonded to the outer surface of a receptacle wall and electrically coupled thereto, a ground conductor for coupling liquid in the receptacle to ground potential, and an electrical charge source for supplying electrical charge to the electrode to thereby cause development of capacitance between the receptacle walls and the liquid.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

The function of the present invention is to detect the volume of an electrically-conductive liquid contained in a fiber-reinforced composite tank, such liquid being, for example, waste or water. The invention utilizes capacitance as the mode of sensing the volume of liquid, but without requiring separate capacitive plates to develop the capacitance. Rather, the capacitance is developed utilizing electrically-conductive composite tank walls.

Figure 1:
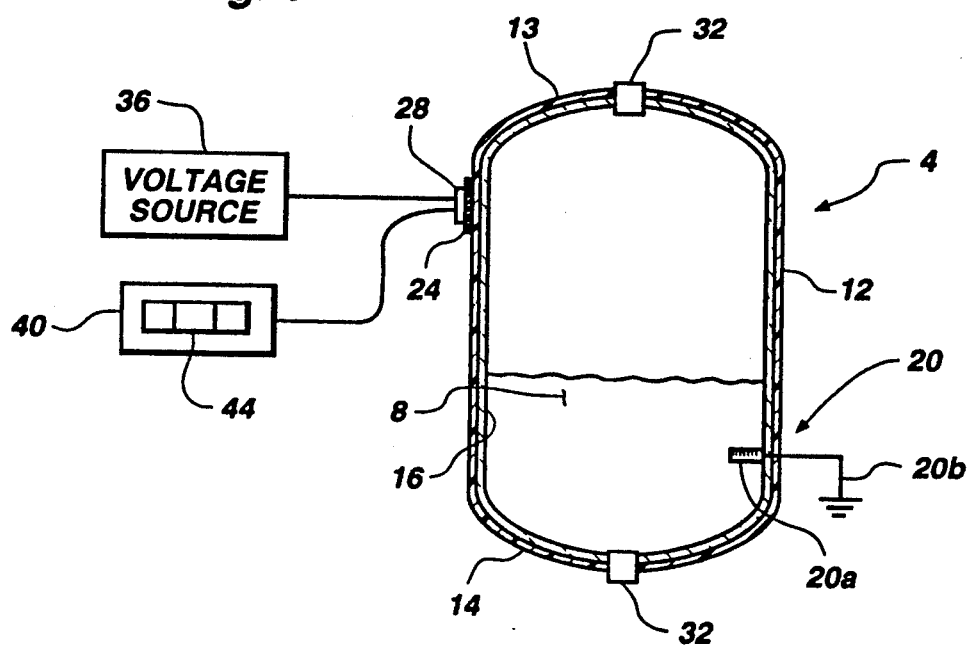
FIG. 1 shows a side, cross-sectional, schematic view of a liquid level sensor and fiber-reinforced composite tank for measuring the level of an electrically conductive liquid in the tank, in accordance with the principles of the present invention.

The above-discussed capability is achievable in one illustrative embodiment of the present invention shown in side, cross-sectional view in FIG. 1. FIG. 1 shows a fiber-reinforced composite tank 4 in which is disposed a conductive liquid 8. The tank 4 includes side walls 12, a top wall 13, and a bottom wall 14, all of which are conductive since the fibers reinforcing the composite material are conductive. Such fibers might include carbon fibers, metal-coated glass fibers, and the like.

On the inside of the tank 4, disposed against the inside surface of the walls, is a non-conductive tank liner 16. The tank liner 16 is disposed over the entire inside surface of the tank and is made, for example, of non-conductive polymers such as polyethylene, polyamide, polyester, and the like.

Figure 2:
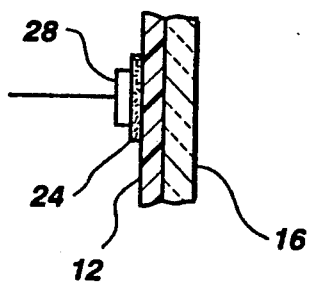
FIG. 2 is a side, fragmented view of the charging electrode and grounding electrode of the sensor shown in FIG. 1.

The conductive liquid 8 in the tank 4 is in contact with the non-conductive tank liner 16 and is grounded by a grounding electrode 20 shown in both FIGS. 1 and 2. In particular, an electrode terminal 20a is disposed inside the tank 4 to extend either along the side wall 12 against the liner or to project from the side wall inwardly into the liquid 8 as shown in the FIGS. The electrode terminal 20a is coupled by way of a conductor 20b, through the side wall of the tank 4, to ground. The conductor 20b, of course, is electrically insulated from the composite side wall of the tank by any conventional insulator material and sealed to prevent leaking of liquid from the tank 4. The conductor 20b could be coupled to a base or support structure on which the tank were mounted, the frame of an aircraft carrying the tank, or the frame of any other vehicle in which the tank might be installed, etc., all of which would serve as a source of ground potential.

A conductive adhesive 24 is disposed on the exterior of the tank 4 to hold an electrode 28 in electrical contact therewith. In other words, the electrode 28 is both electrically and structurally bonded to the outside of the tank wall 12. Advantageously, the adhesive 24 is copper-filled epoxy or silver-filled epoxy, and the electrode is a metal or metal alloy.

The electrode 28 is coupled by a conductor to a voltage source 36 which supplies a charge to the electrode and, in turn, to the walls 12, 13 and 14 of the tank 4. The non-conductive liner 16 serves as a dielectric in a capacitor composed of the conductive walls 12, 13 and 14 of the tank 4 and the conductive liquid 8. Since capacitance depends upon the area of the plates of a capacitor, the capacitance produced in the tank 4 will depend upon the level or volume of the conductive liquid 8 in the tank (the liquid taking the place of one plate). That is, the greater the volume of liquid 8 in the tank 4, the greater will be the charge which the tank "capacitor" can hold, and vice versa. Thus, the amount of charge being held by the tank "capacitor" provides an indication of the volume of liquid in the tank.

The amount of this charge or the capacitance is detected by a capacitance detecting device 40 and the amount of capacitance is displayed on a visual display 44 of the device. The measure of the capacitance thus provides a measure of the volume of liquid in the tank 4. The capacitance measuring device 40 might illustratively be a conventional capacitance bridge measuring device with a visual display, connected to the electrode 28.

By making the thickness of the dielectric tank liner 16 greater at the polar openings 32 in the top wall 13 and bottom wall 14, the capacitance reading can be made to be linearly proportional to the volume of liquid in the tank. That is, since capacitance decreases as the separation between plates (thickness of the dielectric) increases, and since as the tank fills and the level rises toward the upper polar opening 32, the capacitance would normally increase at a rate much faster than the filling rate, by making the liner 16 thicker towards the polar openings, the increase in capacitance can be made to be linearly proportional to the increase in liquid volume.

By utilizing the walls of the tank 4 as the sensor, the addition of separate electrical components is avoided, and this provides for a simple and lightweight approach to measuring the volume of conductive liquid contained in an electrically conductive fiber-reinforced composite tank.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A liquid level sensor for determining the level of an electrically conductive liquid in a receptacle comprising:
    electrically conductive, fiber-reinforced composite walls defining the receptacle, and including an outer surface and an inner surface,
    a non-conductive liner disposed in the receptacle against the inner surface thereof to define a volume for receiving the electrically conductive liquid,
    means for developing an electrical capacitance between the receptacle walls and the liquid contained in the receptacle, said capacitance varying with variation in the level of the liquid, and
    means for measuring the capacitance to thereby provide a measure of the level of the liquid.

2. A liquid level sensor as in claim 1 wherein the walls of the receptacle are constructed of a carbon fiber reinforced composite.

3. A liquid level sensor as in claim 2 wherein the walls of the receptacle are formed with hoop and helically wound fibers.

4. A liquid level sensor as in claim 1 wherein capacitance developing means comprises
    electrode means bonded to the outer surface of the receptacle walls and electrically coupled thereto,
    means for grounding the liquid in the receptacle, and
    means for supplying an electrical charge to the electrode means to thereby cause development of a capacitance between the receptacle walls and the liquid.

5. A liquid level sensor as in claim 4 further comprising an electrically conductive bonding material for bonding the electrode means to the outer surface of the receptacle walls.

6. A liquid level sensor as in claim 5 wherein the bonding material is selected from the group consisting of copper-filled epoxy and silver-filled epoxy.

7. A liquid level sensor as in claim 4 wherein said measuring means comprises means coupled to said electrode means for providing a visual indication of the capacitance developed between the receptacle walls and the liquid, to thereby provide a visual indication of the level of the liquid in the receptacle.

8. A liquid level sensor, as in claim 1 wherein the receptacle further comprises a top pole and bottom pole located at a top and bottom respectively of the receptacle, and wherein the liner increases in thickness from a middle of the receptacle toward both the top pole and bottom pole so that the capacitance increases linearly proportionally to the increase in the level of the liquid in the receptacle.

9. A liquid level sensor as in claim 1 wherein the liner is made of a non-conductive polymer.

10. Apparatus for measuring the volume of an electrically conductive liquid held in a confined area comprising
    a tank constructed of electrically conductive, fiber-reinforced composite material and having side walls, a top wall, a bottom wall, an inside surface, and an outside surface,
    an electrically insulative liner disposed in the tank against the inside surface thereof, to receive and hold the liquid therewithin,
    voltage means for supplying an electrical charge to the tank walls and liquid to develop a capacitance therebetween, said capacitance varying with variation in the volume of liquid in the tank, and
    means for determining the capacitance of the tank, and therefore the volume of liquid in the tank.

11. Apparatus as in claim 10 wherein said liner thickness varies from the bottom wall to the top wall of the tank so that the capacitance varies linearly with linear variation in the volume of liquid in the tank.

12. Apparatus ad in claim 10 wherein the liner is made of non-conductive polymeric materials.

13. Apparatus as in claim 10 wherein the tank is constructed of carbon, fiber-reinforced composite material.

14. Apparatus as in claim 10 wherein said voltage means comprises a charging electrode bonded by an electrically-conductive bonding agent to the outside surface of the side walls,
    a grounding electrode for connecting liquid in the tank to ground potential, and
    voltage supply means for supplying a voltage to the charging electrode to develop the capacitance of the tank.

* * * * *